(12) United States Patent
Singh et al.

(10) Patent No.: US 12,014,160 B2
(45) Date of Patent: Jun. 18, 2024

(54) TRANSLATING BETWEEN PROGRAMMING LANGUAGES INDEPENDENTLY OF SEQUENCE-TO-SEQUENCE DECODERS

(71) Applicant: Google LLC, Mountain View, CA (US)

(72) Inventors: Rishabh Singh, San Jose, CA (US); Manzil Zaheer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 170 days.

(21) Appl. No.: 17/717,609

(22) Filed: Apr. 11, 2022

(65) Prior Publication Data

US 2023/0325164 A1    Oct. 12, 2023

(51) Int. Cl.
*G06F 8/51* (2018.01)
*G06F 8/73* (2018.01)
*G06F 18/23213* (2023.01)

(52) U.S. Cl.
CPC ............ *G06F 8/51* (2013.01); *G06F 8/73* (2013.01); *G06F 18/23213* (2023.01)

(58) Field of Classification Search
CPC ..... G06F 8/51; G06F 8/73; G06F 8/44; G06F 8/447
See application file for complete search history.

(56) References Cited

U.S. PATENT DOCUMENTS

| | | | |
|---|---|---|---|
| 10,963,652 B2 | 3/2021 | Hashimoto et al. | |
| 11,138,392 B2 | 10/2021 | Chen et al. | |
| 2020/0082226 A1 | 3/2020 | Shazeer et al. | |
| 2021/0011694 A1 | 1/2021 | Ni et al. | |
| 2022/0214863 A1* | 7/2022 | Clement | G06N 3/044 |
| 2022/0284028 A1* | 9/2022 | Meng | G06F 16/3347 |
| 2022/0308845 A1* | 9/2022 | Krishnamoorthy | G06F 8/36 |
| 2023/0161567 A1* | 5/2023 | Clement | G06N 3/08 717/106 |

(Continued)

OTHER PUBLICATIONS

European Patent Office; International Search Report and Written Opinion issued in Application No. PCT/US2023/017719; 16 pages; dated Sep. 25, 2023.

(Continued)

*Primary Examiner* — Wei Y Zhen
*Assistant Examiner* — Amir Soltanzadeh
(74) *Attorney, Agent, or Firm* — Gray Ice Higdon

(57) ABSTRACT

Techniques are described herein for translating a source code snippet from a first programming language to a second programming language independently of sequence-to-sequence decoding. In various implementations, the source code snippet written in the first programming language may be processed using an encoder portion of a transformer network to generate an embedding of the source code snippet. The embedding of the source code snippet may be processed using an all-pair attention layer to generate an attended embedding of the source code snippet. The attended embedding of the source code snippet may be processed using an output layer to generate, by way of a single transformation of the attended embedding of the source code snippet, data indicative of a translation of the source code snippet in the second programming language.

14 Claims, 6 Drawing Sheets

(56) References Cited

U.S. PATENT DOCUMENTS

| | | | | |
|---|---|---|---|---|
| 2023/0229912 A1* | 7/2023 | Zhang | ............. | G06N 3/082 706/25 |
| 2023/0281318 A1* | 9/2023 | Clement | ............. | G06F 8/42 726/25 |
| 2023/0305824 A1* | 9/2023 | Allamanis | ............. | G06F 8/51 717/111 |

OTHER PUBLICATIONS

European Patent Office; Invitation to Pay Additional Fees issued in Application No. PCT/US2023/017719; 9 pages; dated Jul. 31, 2023.

Schmidt-Thieme, Lars, "Deep Learning" Information Systems and Machine Learning Lab (ISMLL), University of Hildesheim, Germany. 41 pages.

Huijben et al., "A Review of the Gumbel-max Trick and its Extensions for Discrete Stochasticity in Machine Learning" arXiv:2110.01515v2 [cs.LG] dated Mar. 8, 2022, 22 pages.

Lee et al., "Deterministic Non-Autoregressive Neural Sequence Modeling by Iterative Refinement" arXiv:1802.06901v3 [cs.LG] dated Aug. 27, 2018. 11 pages.

Zhao, Xu, "Parallel Decoders with Parameter Sharing" Oracle AI & Data Science Newsletter. Dated Jul. 22, 2020, 8 pages.

Stern et al., "Blockwise Parallel Decoding for Deep Autoregressive Models" arXiv:1811.03115v1 [cs.LG] dated Nov. 7, 2018. 10 pages.

Kaiser et al., "Fast Decoding in Sequence Models Using Discrete Latent Variables" arXiv:1803.03382v6 [cs.LG] dated Jun. 7, 2018. 10 pages.

Brownlee, Jason, "What is Teacher Forcing for Recurrent Neural Networks?" Machine Learning Mastery, dated Dec. 6, 2017. 22 pages.

Vaswani et al., "Attention is All You Need" arXiv:1706.03762v5 [cs.CL] dated Dec. 6, 2017, 15 pages.

* cited by examiner

TRANSLATING BETWEEN PROGRAMMING LANGUAGES INDEPENDENTLY OF SEQUENCE-TO-SEQUENCE DECODERS

BACKGROUND

Computer software programming often requires developers to read and/or write source code (i.e., to program) in a specific language, e.g. Java, C++, C, Python, etc. Each programming language has its own strengths, weaknesses, nuances, idiosyncrasies, etc. Additionally, some programming languages are more suitable for certain stages of software development and/or a software life cycle than others. As one example, scripting languages such as Python, JavaScript, Perl, etc., are often more effectively used near the very beginning of software development because programmers using these languages are able to turn around functional software relatively quickly. Most programmers obtain at least a superficial understanding of multiple programming languages, but only master a few. Consequently, each programming language tends to have its own talent pool.

Large language models such as transformer networks have become increasingly popular for performing natural language processing. Transformer networks were designed in part to mitigate a variety of shortcomings of prior natural language processing models, such as overfitting, the vanishing gradient problem, and exceedingly high computational costs, to name a few. However, transformer networks are still implemented typically as sequence-to-sequence, encoder-decoder models. The decoder portions in particular require significant sequential computational processing, and as a consequence, introduce considerable latency during both training and inference.

SUMMARY

Techniques are described herein for translating source code in a "base" programming language to source code in another programming language, or "target" programming language, using machine learning. Among other things, this allows programmers who might be unfamiliar with a base programming language to nonetheless view and/or edit source code written in the base language by first translating the source code to another, more familiar programming language.

More particularly, but not exclusively, implementations are described herein for translating source code between programming languages, independently of sequence-to-sequence decoding, e.g., using only the encoder part of a transformer network. In place of sequence-to-sequence decoding, one or more layers of a machine learning model configured with selected aspects of the present disclosure may be trained to generate, in parallel, all target language tokens as a single transformation, corresponding to a translation of a source code snippet in a target programming language. For example, a matrix of probability distributions over a vocabulary of the target programming language may be generated. Tokens of the translation of the source code snippet may then be selected based on these probability distributions.

In some implementations, a method may be provided for translating a source code snippet from a first programming language to a second programming language independently of sequence-to-sequence decoding. The method may be implemented by one or more processors and may include: processing the source code snippet written in the first programming language using an encoder portion of a transformer network to generate an embedding of the source code snippet; processing the embedding of the source code snippet using an all-pair attention layer to generate an attended embedding of the source code snippet; and processing the attended embedding of the source code snippet using an output layer to generate, by way of a single transformation of the attended embedding of the source code snippet, data indicative of a translation of the source code snippet in the second programming language.

In various implementations, the data indicative of the translation may be a matrix of probability distributions. In various implementations, the matrix may be an x by y matrix, with x being a non-zero integer equal to a number of tokens extracted from the source code snippet. In various implementations, y is a non-zero integer equal to a vocabulary size of the second programming language.

In various implementations, the method may further include selecting the tokens of the translation of the source code snippet in the second programming language based on maximum probabilities in the matrix of probability distributions. In various implementations, the method may further include sampling from the matrix of probability distributions to generate one or more alternative translations of the source code snippet. In various implementations, the sampling may include using the Gumbel-max trick, random temperature-based sampling, top-k sampling, or nucleus sampling.

In another related aspect, a method of training a translation model to translate source code from a first programming language to a second programming language, without using a sequence-to-sequence decoder, may include: iteratively training the translation model using a pair of source code snippets, including an original source code snippet written in the first programming language and a ground truth translation of the original source code snippet in the second programming language, wherein during each iteration, the training includes: processing the original source code snippet using one or more encoder layers of the translation model to generate a embedding of the original source code snippet; processing data indicative of the embedding using an output layer to generate, by way of a single transformation, data indicative of a predicted translation of the original source code snippet in the second programming language; selecting a different subset of one or more predicted tokens of the predicted translation of the original source code snippet in the second language that has not yet been used to train the translation model; comparing the selected subset of one or more tokens to a corresponding subset of one or more tokens of the ground truth translation of the original source code snippet in the second programming language; and training the machine learning model based on the comparison.

In various implementations, during each iteration, the training may include processing the embedding of the source code snippet using an all-pair attention layer to generate an attended embedding of the source code snippet, wherein the data indicative of the first embedding comprises the attended embedding. In various implementations, the translation model may be a transformer network.

In various implementations, the output layer may be a softmax layer. In various implementations, the data indicative of the predicted translation may be a matrix of probability distributions, such as an x by y matrix, with x being a non-zero integer equal to a number of tokens extracted from the source code snippet and y being a non-zero integer equal to a vocabulary size of the second programming language.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
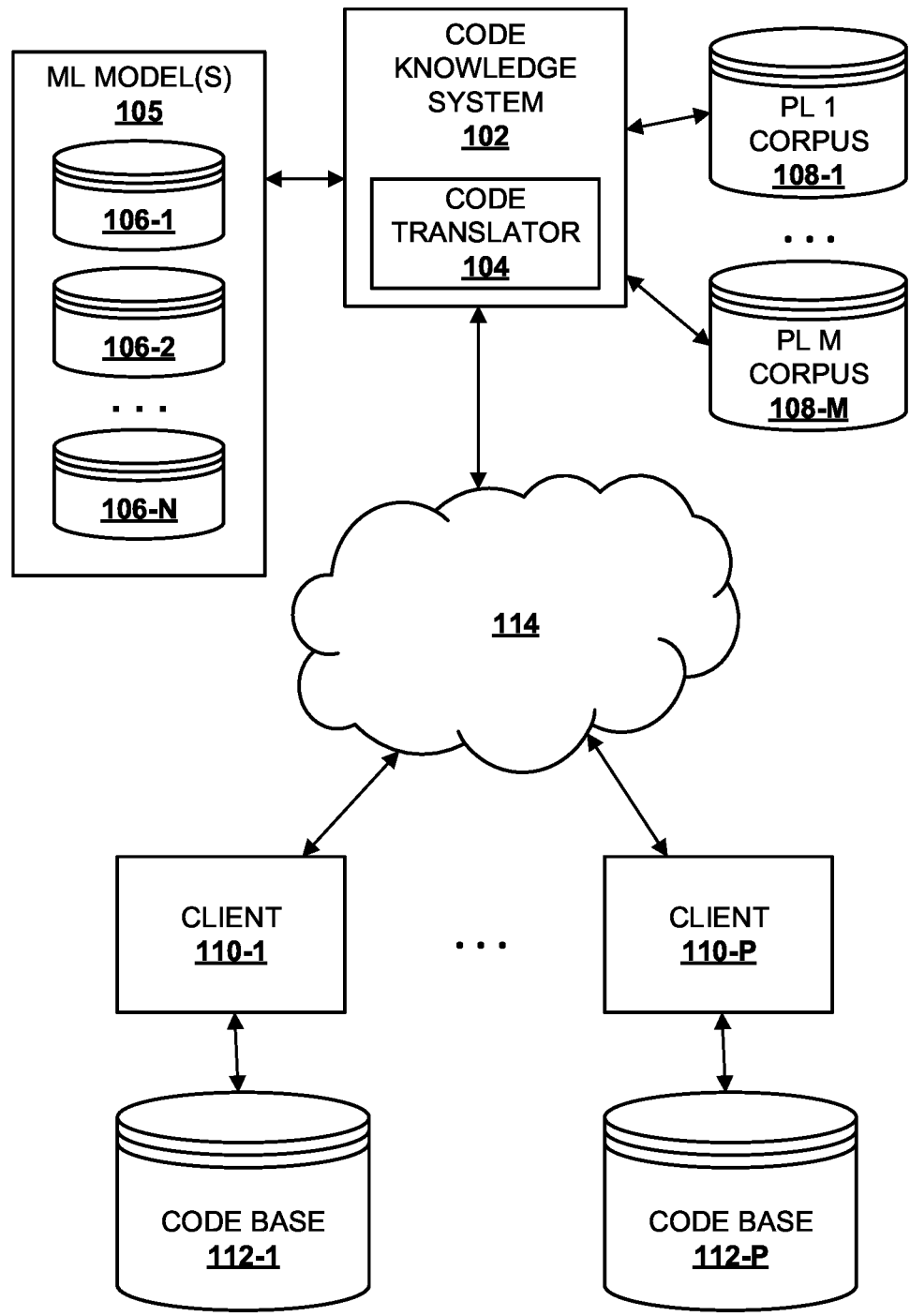
FIG. 1 schematically depicts an example environment in which selected aspects of the present disclosure may be implemented, in accordance with various implementations.

Implementations are described herein for translating structured textual data between domain-specific languages. More particularly, but not exclusively, implementations are described herein for translating source code between programming languages, independently of sequence-to-sequence decoding, e.g., using only the encoder part of a transformer network. In place of sequence-to-sequence decoding, one or more layers of a machine learning model configured with selected aspects of the present disclosure may be trained to generate, as a single transformation, data indicative of a translation of a source code snippet in a target programming language. For example, a matrix of probability distributions over a vocabulary of the target programming language may be generated in parallel. Tokens of the translation of the source code snippet may then be selected based on these probability distributions.

In some implementations, a machine learning model configured with selected aspects of the present disclosure may include part of a transformer network, such as a BERT (Bidirectional Encoder Representations from Transformers) transformer and/or a GPT (Generative Pre-trained Transformer). For example, one or more encoder layers of a BERT transformer may be directly coupled with downstream layers configured with selected aspects of the present disclosure to facilitate source code translation independently of sequence-to-sequence decoding. In some implementations, these encoder layers—and/or a whole transformer model from which these layers are obtained—may be trained initially using a corpus of documents and other data that is relevant to structured text in general, or programming languages in particular. These documents may include, for instance, source code examples, programming handbooks or textbooks, general programming documentation, natural language comments embedding in source code, and so forth.

After this initial training, the encoder layer(s) may be coupled with custom layers described herein to create an "encoder-only," or "decoder-free," translation model configured with selected aspects of the present disclosure. Once trained as described below, the encoder layer(s) of the translation model may be applied to a source code snippet in a base programming language to generate a semantically-rich source code embedding. In some implementations, this source code embedding may then be processed using an attention layer, such as an "all-pair" attention layer, to generate what will be referred to herein as an "attended" embedding or "summary representation." This attended embedding may then be processed using an output layer (e.g., softmax) of the translation model to generate, as a single transformation, the aforementioned data indicative of a translation of the source code snippet in the target programming language. As noted above, in some implementations, this data may include a matrix of probability distributions over the vocabulary of the target programming language.

Attempting to train the translation model based on a comparison of an entire predicted translation to an entire ground truth translation may not be practical, and/or may not generate an accurate translation model. Accordingly, in various implementations, the translation model may be trained using curriculum and/or teacher forcing training. For example, the above-described layers of the translation model (e.g., encoder(s), attention layer, output layer) may be iteratively applied to the same source code snippet in a base programming language as described above to generate, during each iteration, a new matrix of probability distributions. Each probability distribution may be used to select a token of a potential translation of the source code snippet in the target programming language. In some implementations, a subset or subsequence of these selected tokens, such as a single token, may be compared to corresponding ground truth tokens during a given training iteration. Subsequent tokens of the translation may be ignored for this iteration of training.

Once an iteration of training is complete, during a next training iteration, the source code snippet may once again be processed using the translation model. However, during this next iteration, a "next" subset (or subsequence) of selected tokens, such as the just-considered token and the very next token, may be used to train the translation model. Tokens outside of this next subset (e.g., subsequent tokens) may be ignored. This process may be repeated for each sub-sequence (e.g., each additional token) of the translation. As a result, training may be a relatively laborious and time-consuming process. However, the time and computational resources required for inference compared to a conventional translation model that relies on sequence-to-sequence decoding may be reduced dramatically. This may enable the trained translation model to be deployed at the "edge," e.g., on resource-constrained devices such as programmers' personal computers. Facilitating edge-based translation may provide other benefits as well, such as protecting sensitive source code (e.g., proprietary, trade secrets, etc.) from outside exposure. In addition, this may also enable significant reduction in latency for performing translations, allowing for programming language translation in real-time development environments.

One consequence of foregoing traditional decoding is that decoder-based beam searching may no longer be available. A benefit of decoder-based beam searching is that alternative translations can be readily identified/generated during decoding, e.g., so that a user can, for instance, toggle through multiple candidate translations to select the best one, or even have multiple alternative tokens suggested for translation. To enable generation of alternative translations without decoder-based beam searching, various techniques may be used to sample tokens from the matrix of probability distributions. For example, rather than naively selecting the maximum probability token from every probability distribution, techniques such as the Gumbel-max trick, random temperature-based sampling, top-k sampling, or nucleus sampling, may be used to select tokens for alternative translation(s) that appear, at least to the user, similar to alternative translations generated conventionally using decoder-based beam searching.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or "TPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients 110-1 to 110-P manage their respective code bases 112-1 to 112-P. Code knowledge system 102 may include, among other things, a code translator 104 that is configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Code translator 104 may be configured to leverage knowledge of multiple different programming languages in order to aid clients 110-1 to 110-P in translating between programming languages when editing, updating, re-platforming, migrating, or otherwise acting upon their code bases 112-1 to 112-P. For example, code translator 104 may be configured to translate code snippets from one programming language to another, e.g., on the fly or in batches. This may, for instance, enable a developer fluent in a first programming language to view and/or edit source code that was originally written in a second, less-familiar programming language in the first programming language. It may also significantly decrease the time and/or costs associated with migrating code bases between different programming languages.

In various implementations, code knowledge system 102 may include a machine learning ("ML" in FIG. 1) database 105 that includes data indicative of one or more trained machine learning models 106-1 to 106-N. These trained machine learning models 106-1 to 106-N may take various forms that will be described in more detail below, including but not limited to BERT (Bidirectional Encoder Representations from Transformers) transformers, GPT (Generative Pre-trained Transformer) transformers, a graph-based network such as a graph neural network ("GNN"), graph attention neural network ("GANN"), or graph convolutional neural network ("GCN"), other types of sequence-to-sequence models and/or encoder-decoders, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, code knowledge system 102 may also have access to one or more programming-language-specific corpuses 108-1 to 108-M. In some implementations, these programming-language-specific corpuses 108-1 to 108-M may be used, for instance, to train one or more of the machine learning models 106-1 to 106-N. In some implementations, the programming-language-specific corpuses 108-1 to 108-M may include examples of source code (e.g., entire code bases, libraries, etc.), inline comments, textual metadata associated with source code (e.g., commits), documentation such as textbooks and programming manuals, programming language-specific discussion threads, presentations, academic papers, and so forth.

In some implementations, a client 110 that wishes to enable manipulation of its code base 112 in programming language(s) other than that/those used originally to write the source code may establish a relationship with an entity (not depicted in FIG. 1) that hosts code knowledge system 102. When a developer wishes to view/edit a source code snippet of the entity's code base 112 but is unfamiliar with the native programming language, code translator 104 may provide one or more versions of the source code snippet that is translated to a target programming language preferred by the developer. In some such implementations, code translator 104 may generate the translated source code snippet on the fly, e.g., in real time. In other implementations, code translator 104 may operate, e.g., in a batch mode, to preemptively translate all or selection portions of an entity's code base 112 into a targeted programming language. In some implementations in which the developer then edits the translated source code snippet, the edited version may be translated back into the native programming language or left in the new, target programming language, assuming other necessary infrastructure is in place.

In other implementations, trained translation models may be deployed closer to or at the edge, e.g., at client devices 110-1 to 110-P. Because these trained translation models do not necessarily include sequence-to-sequence decoders, and because encoders tend to be more computationally efficient than decoders, these trained translation models may be effectively applied at the edge, rather than in the cloud. As mentioned previously, edge-based deployment may give rise to a variety of benefits, such as maintenance of privacy, protection of sensitive source code, and so forth.

Figure 2:
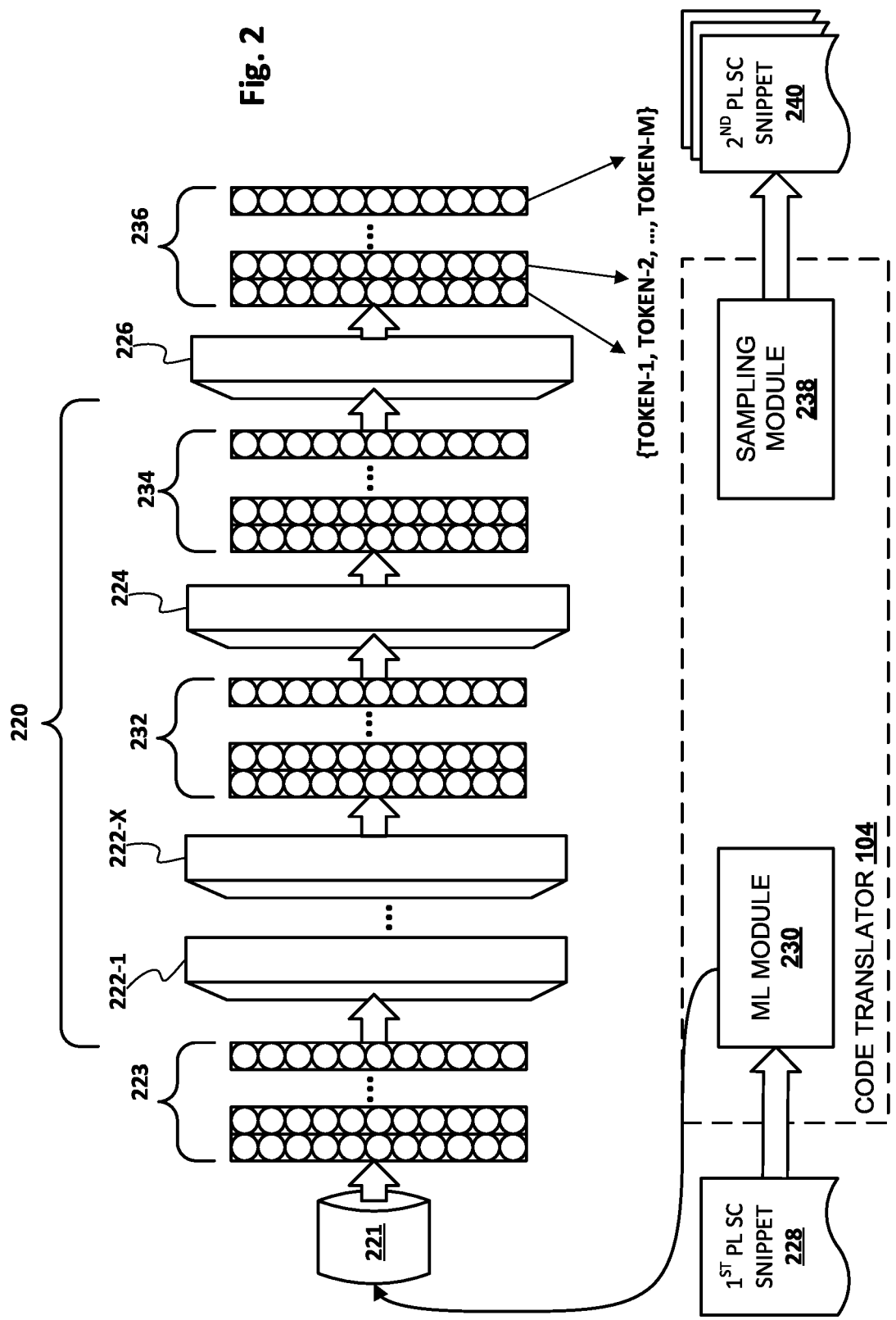
FIG. 2 is a block diagram showing an example of how source code may be translated, in accordance with various implementations.

FIG. 2 is a block diagram of an example process flow that may be implemented in whole or in part by code translator 104 in order to use a translation machine learning model 220 (also referred to simply as a "translation model 220") to translate source code between programming languages. In this example, translation machine learning model 220 includes some number of encoder layers 222-1 to 222-X, followed by an attention layer 224 and an output layer 226.

In some implementations. encoder layers 222-1 to 222-X may correspond, for instance, to encoder layers of a large language model such as a BERT or GTP transformer. For example, an entire transformer network, e.g., encoder layers 222-1 to 222-X plus one or more decoder layers (not depicted in FIG. 2), may be trained or bootstrapped on any number of programming language-specific corpuses 108-1 to 108-M. Once trained, the decoders (not depicted in FIG. 2) may be discarded or decoupled from the encoder layers 222-1 to 222-X. The encoder layers 222-1 to 222-X may then be coupled with attention layer 224 and output layer 226 to form translation model 220, which can be further trained as described herein.

Code translator 104 may include a machine learning ("ML" in FIG. 2) module 230 that is configured to process various data using machine learning model(s) to translate source between programming languages. To start, ML module 230 may extract tokens from first programming language source code snippet 228 and may use a token extraction model 221 to generate token embeddings 223 of those tokens. Token extraction model 221 may take various forms, such as that often used as part of the word2vec framework.

ML module 230 may then apply these token embeddings 223 as input across encoders 222-1 to 222-X to generate a source code embedding 232 of first programming language source code snippet 228 (alternatively referred to herein as an "encoding" of the source code snippet). Source code embedding 232 may be a semantically-rich representation/encoding of first programming language source code snippet 228, including the tokens and relationships/logic between the tokens that is defined by the syntax and structure of first programming language source code snippet 228.

Embeddings such as token embeddings 223 generated based on token extraction model 221 and/or source code embedding 232 may take various forms, such as a one dimensional vector or a two-dimensional matrix. As one non-limiting example, suppose there are 512 tokens in first programming language source code snippet 228, and that the dimension of token embeddings generated based on token extraction model 221 is 768. The resulting token embeddings matrix 223 may be a 512×768 matrix of token embeddings. Similarly, if source code embedding 232 has 2048 different dimensions, then source code embedding 232 may be a 512×2048 matrix. These dimensions are merely examples, and other dimensions are possible.

In various implementations, ML module 230 may then apply source code embedding 232 as input across attention layer 224. In some implementations, attention layer 224 may be an "all pairs" attention layer that attends across all pairs of features represented in source code embedding 232. The result may be an attended source code embedding 234. As with other embeddings (223, 232) depicted in FIG. 2, attended source code embedding 234 may have various dimensions. If source code embedding 232 is 512×2048, in some implementations, attended source code embedding 234 may also be a 512×2048 matrix.

Attended source code embedding 234 may then be applied across output layer 226 to generate, in parallel as a single transformation (as opposed to sequence-to-sequence decoding), data indicative of a translation of first programming language source code snippet 228. In FIG. 2, for instance, output layer 226 may be a softmax layer that generates, as a single transformation of attended source code embedding 234, an output matrix 236. Output matrix 236 may be an x by y (both positive integers) matrix of probability distributions over a vocabulary of the second programming language. In some implementations, output matrix 236 may have, as its x dimension, a number of token inputs, and as its y dimension, a vocabulary size. Accordingly, continuing the example used above, if there are 512 input tokens, and the vocabulary size is 20,000, then output matrix 236 may have a dimension of 512×20,000.

In various implementations, a sampling module 238 may be configured to sample a token from each probability distribution of output matrix 236. In FIG. 2, each probability distribution corresponds to a column of output matrix 236. In some implementations, sampling module 238 may select the token with the maximum probability from each probability distribution (column). These selected tokens {TOKEN-1, TOKEN-2, . . . } may then be used to formulate a second programming language source code snippet 240 that is a translation of first programming language source code snippet 228.

Because translation model 220 forgoes sequence-to-sequence decoding, and instead generates the probability distributions of 236 in parallel, some sequence-to-sequence decoder-specific techniques for generating alternative translations, such as beam searching, may not be available. However, it may still be desirable to provide a programmer with variations of a translation of a first programming language snippet, e.g., so that the programmer can use their judgment to select the best translation (this feedback can also be used continuously to train translation model 220).

Accordingly, in various implementations, sampling module 238 may sample multiple times from output matrix 236 to generate a plurality of candidate second programming language snippets 240. Rather than simply selecting the token from each probability distribution with the maximum probability, sampling module 238 may use other sampling techniques, including but not limited to the Gumbel-max trick, random temperature-based sampling, top-k sampling, or aureus sampling.

Figure 3:
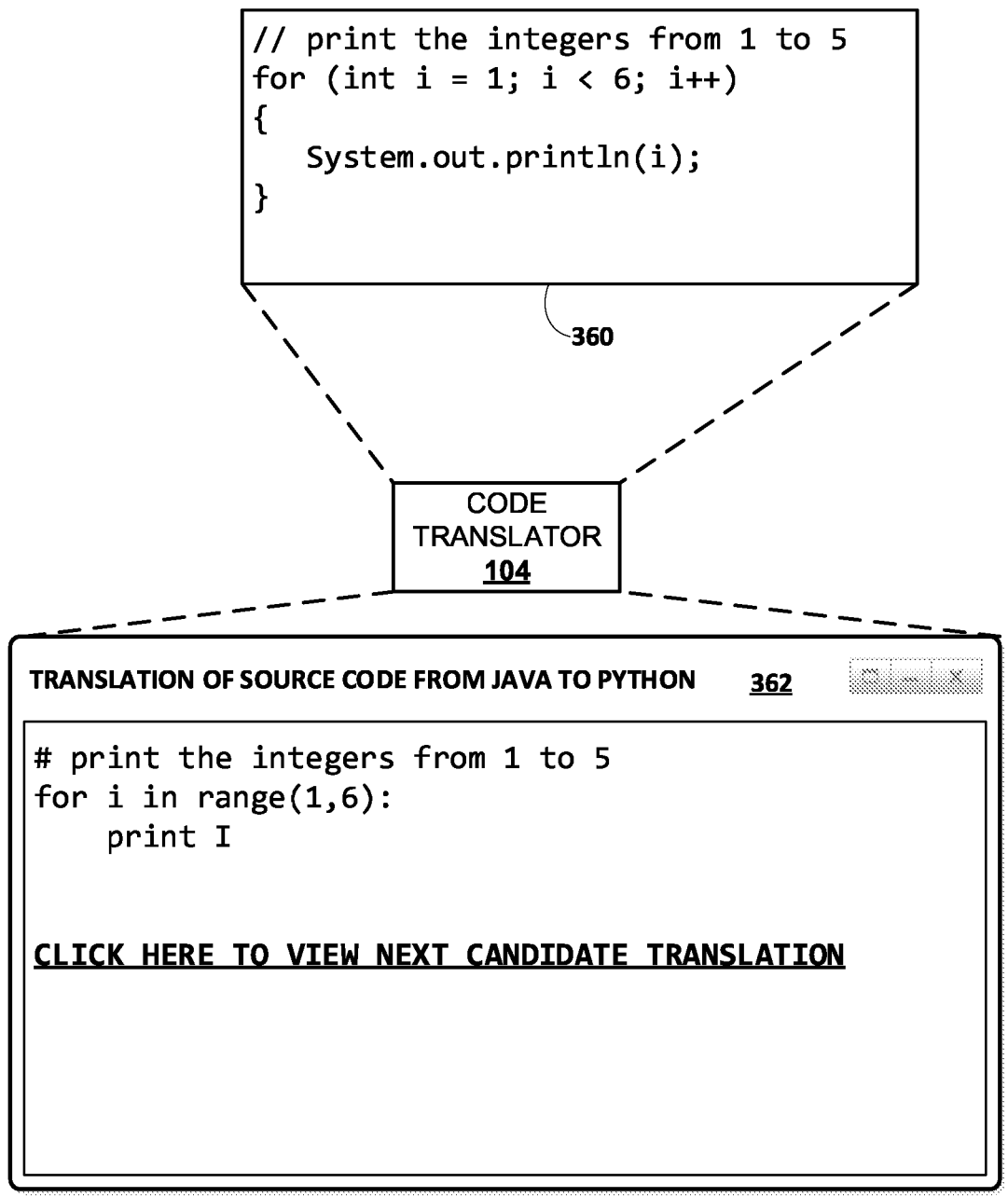
FIG. 3 depicts an example application of techniques described herein, in accordance with various implementations.

FIG. 3 depicts an example scenario in which a code snippet written in one programming language may be translated to another programming language. In this example, the base source code snippet 360 is written in Java and prints the integers one to five. At bottom, a graphical user interface ("GUI") 362 is depicted that may be presented to a developer who is unfamiliar with Java, but who has expertise in another programming language. In this example, the code snippet 360 written in Java is converted by code translator 104 into Python and rendered as part of GUI 362. In this way, the developer operating GUI 362 may view the source code in a programming language with which he or she is more familiar. In some cases, the developer may be able to edit the translated source code. In some such implementations, the edits made by the developer (i.e. to the Python code in FIG. 3) may be translated back to Java before being stored and/or more permanently incorporated into the code base. In other implementations, the edited Python code may be incorporated into the code base.

In some implementations, the original source code 360 may be sent to code knowledge system 102 for translation by code translator 104 prior to being sent to the computing device (not depicted) that renders GUI 362. In other implementations, GUI 362 may be part of a software development application that performs the programming language translation locally, e.g., using a plug-in or built-in functionality. The scenario of FIG. 3 is for illustrative purposes only.

Source code may be translated between programming languages using techniques described herein for any number of applications.

For example, suppose a first user who is trained in a base programming language sends a source code snippet in the base programming language to a second user, e.g., as an attachment or in the body of an email. In some implementations, the source code in the based programming language may be translated into a target programming language en route to the second user, e.g., by code translator 104. Additionally or alternatively, in some implementations, the second user's email application (or an email server that stores emails of the second user) may have a plugin configured with selected aspects of the present disclosure.

In some implementations, a single user may operate a software development application to view multiple different source code snippets written in multiple different programming languages that are unfamiliar to the user. In some such examples, multiple respective translation models may be used to translate the source code snippets from the multiple different programming languages to a language (or languages) that are better understood to the user.

In some implementations, techniques described herein may be used to automatically convert source code written in one programming language into source code in another programming language, without necessarily presenting translated source code to users as described previously. For example, a company may decide to replatform an existing code base 112 to a new programming language, e.g., to obtain new functionality and/or technical benefits (e.g., security features, processing speed features, etc.) that were unavailable with the original programming language. Such a company may be able to deploy techniques described herein, or request that an entity associated with code knowledge system 102 deploy techniques described herein, to automatically convert all or a portion of a code base 112 from one programming language to another.

As mentioned previously, it may be desirable to present a programmer with multiple different candidate translations of a source code snippet, e.g., so that the programmer can use their judgment to determine which candidate is best. Accordingly, in FIG. 3, a selectable link is presented ("CLICK HERE TO VIEW NEXT CANDIDATE TRANSLATION") that a user can select to see an alternative translation of the original source code snippet. In some implementations, these candidate translations may be presented to the user in a ranked order. This ranked order may be determined in various ways, such as by how many (or few) errors or warnings are raised when attempts are made to parse and/or compile the candidate translations (e.g., in the background without the user being aware). For example, various types of analysis associated with compiling, such as lexical analysis, syntax analysis, semantic analysis, and so forth, may be applied to each candidate translation to determine its score (which may be inversely proportional to the number of errors or warnings generated). The candidates with the "best" scores may be presented to the programmer first. In some implementations, candidate translations may be presented (or at least made available for presentation) until various criteria are met, such as a candidate no longer being capable of being compiled.

Figure 4:
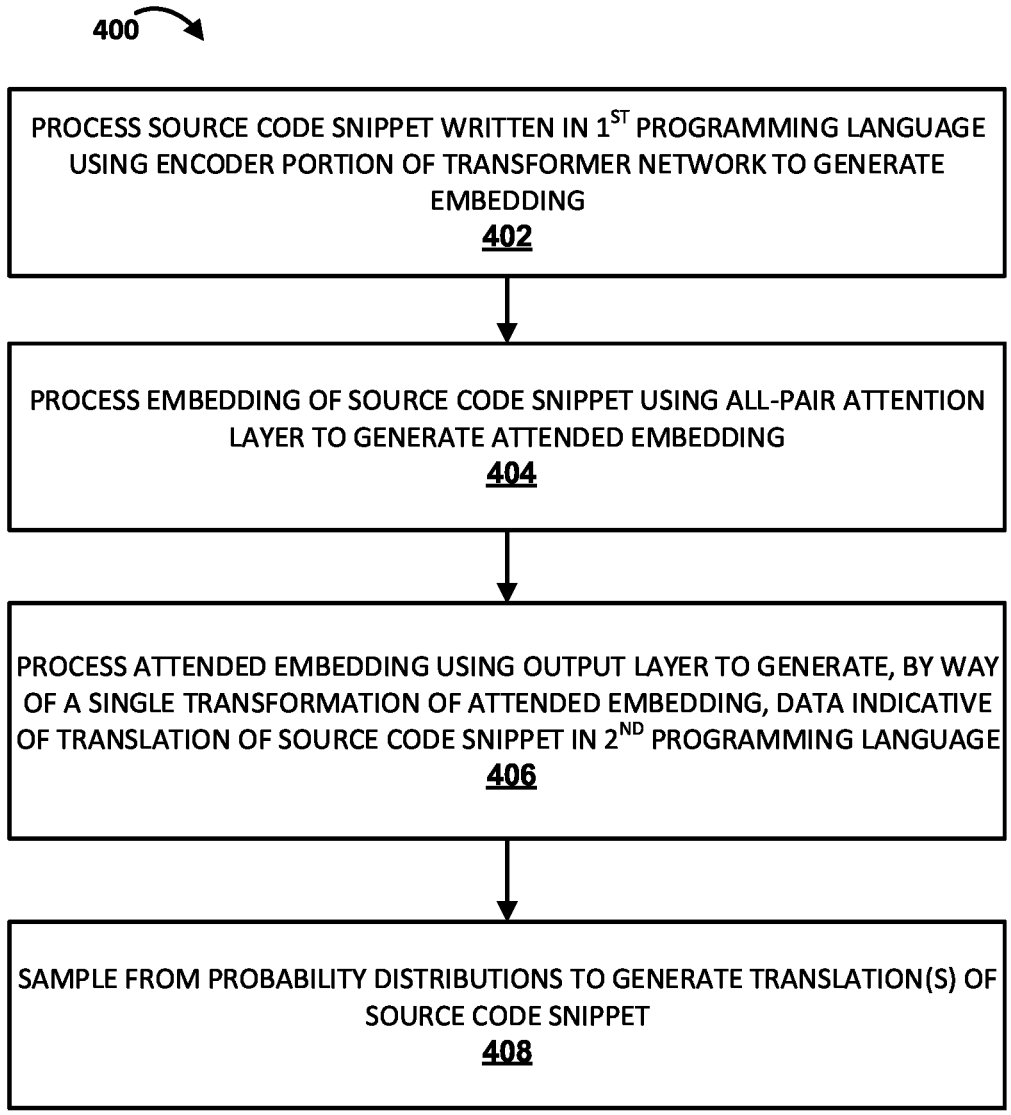
FIG. 4 depicts a flowchart illustrating an example method for practicing selected aspects of the present disclosure.

FIG. 4 is a flowchart illustrating an example method 400 of translating a source code snippet from a first programming language to a second programming language independently of sequence-to-sequence decoding, in accordance with implementations disclosed herein. For convenience, the operations of the flow chart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted or added.

At block 402, the system, e.g., by way of code translator 104 and/or ML module 230, may process the source code snippet (e.g., 228 in FIG. 2) written in the first programming language using an encoder portion (e.g., 222-1 to 222-X in FIG. 2) of a transformer network to generate an embedding (e.g., 232) of the source code snippet. While not depicted in FIG. 4, in some implementations, ML module 230 may first perform a token extraction operation, e.g., using token extraction model 221 (e.g., word2vec), to generate token embeddings 223. These token embeddings 223 may be what is ultimately processed using encoder layers 222-1 to 222-X.

At block 404, the system, e.g., by way of code translator 104, may process the embedding of the source code snippet using an all-pair attention layer (e.g., 224 in FIG. 2) to generate an attended embedding (e.g., 234) of the source code snippet.

At block 406, the system, e.g., by way of code translator 104, may process the attended embedding of the source code snippet using an output layer (e.g., 226 in FIG. 2) to generate, by way of a single transformation of the attended embedding of the source code snippet, data indicative of a translation of the source code snippet in the second programming language. In FIG. 2, for instance, output layer 226 is a softmax layer that generates, as part of a single transformation, matrix 236 of probability distributions. Put another way, ML module 230 generates each probability distribution of output matrix 236 in parallel with the other probability distributions, as opposed to generating tokens one after another as would be the case with a conventional decoder.

At block 408, the system, e.g., by way of sampling module 238, may sample from the probability distributions of output matrix 236 to generate one or more translations of the original source code snippet in the second programming language. In some implementations, sampling module 238 may sample output matrix 236 multiple times to create different candidate translations until, for instance, a confidence measure or quality score associated with a new translation candidate falls beneath a threshold, at which point it may not be worth presenting to a programmer.

Figure 5:
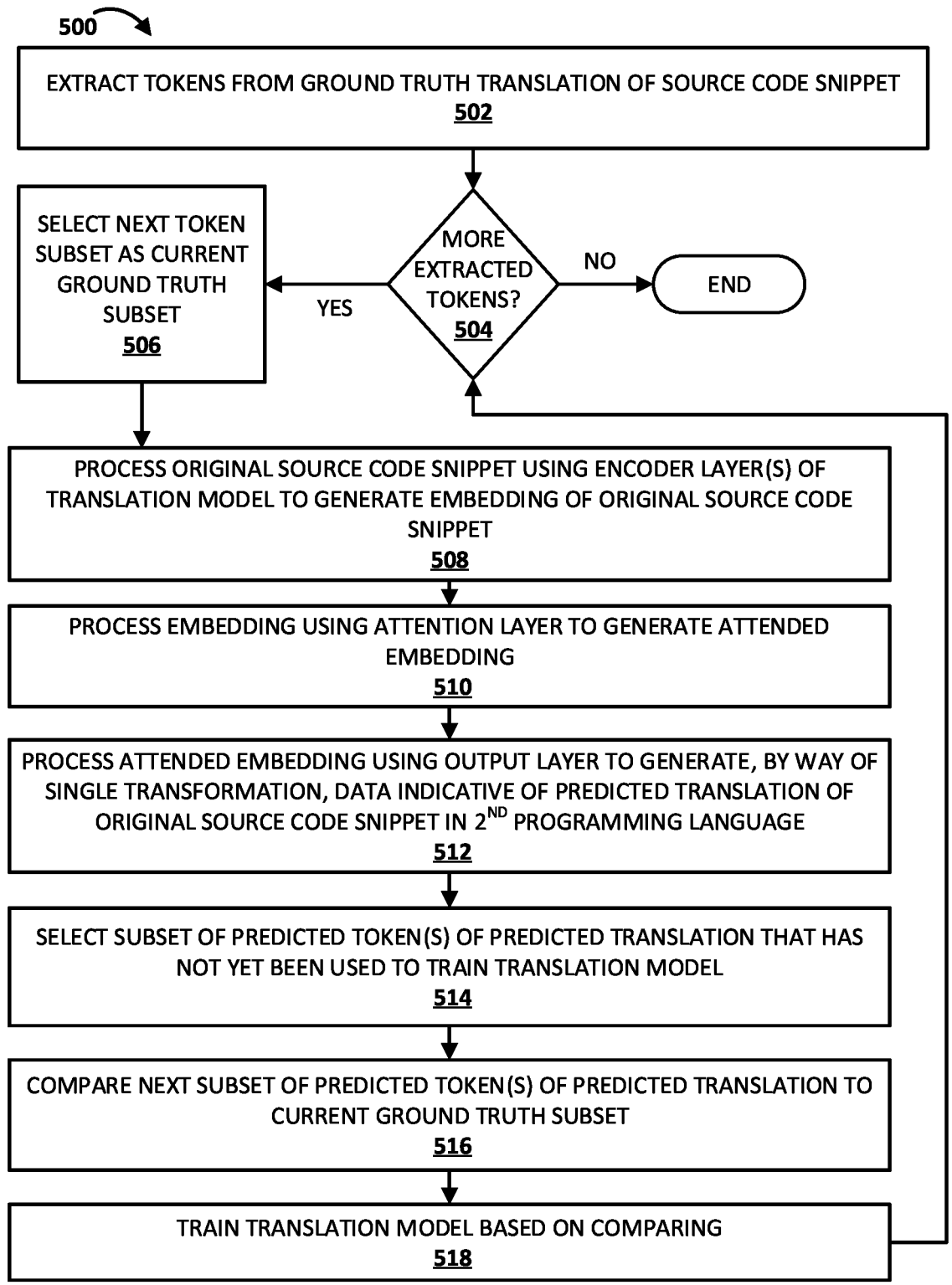
FIG. 5 depicts another flowchart illustrating an example method for practicing selected aspects of the present disclosure.

FIG. 5 is a flowchart illustrating an example method 500 of iteratively training a translation model (e.g., 220) to translate source code from a first programming language to a second programming language, without using a sequence-to-sequence decoder, in accordance with various implementations. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At the outset of method 500, it may be assumed that a training pair of source code snippets is available, including an original source code snippet written in a first programming language and a ground truth translation of the original source code snippet in a second (or target) programming language. At block 502, the system, e.g., by way of ML module 230, may extract tokens from the ground truth translation of the original source code snippet. Thus, if the ground truth translation of the original source code snippet has 512 tokens, 512 tokens may be extracted. These tokens may be referred to herein as "ground truth" tokens because they will be compared to predicted tokens to train the translation model. The system may then enter an iterative loop in which different subsets of predicted tokens are compared to different subsets of ground truth tokens to train the model. At block 504, the system may determine whether there are any more tokens that were extracted during block 502. If the answer is yes, then method 500 may proceed to block 506. At block 506, the system may select a next extracted token subset of one or more ground truth tokens as the current ground truth subset. Then, method 500 may proceed to block 508.

At block 508, the system, e.g., by way of ML module 230, may process the original source code snippet (e.g., 228 in FIG. 2) using one or more encoder layers (e.g., 222-1 to 222-X in FIG. 2) of the translation model (220 in FIG. 2) to generate an embedding (e.g., 232 in FIG. 2) of the original source code snippet. While not depicted in FIG. 5 for brevity, the processing of block 508 may include token extraction and encoding, e.g., using token extraction model 221.

At block 510, the system, e.g., by way of ML module 230, may process the embedding of the original source code snippet using an attention layer (e.g., 224 in FIG. 2) to generate an attended embedding (e.g., 234 in FIG. 2). At block 512, the system, e.g., by way of ML module 230, may process the attended embedding using an output layer (e.g., 226 in FIG. 2) to generate, by way of a single transformation, data indicative of a predicted translation of the original source code snippet in the second programming language. As noted previously, this data indicative of a predicted translation may include, for instance, a two-dimensional matrix of probability distributions across the vocabulary of the target or second programming language.

At blocks 514-518, the system may utilize teaching forcing and/or curriculum learning to train the translation model. For example, at block 514, the system, e.g., by way of ML module 230, may select a different subset of one or more predicted tokens of the predicted translation of the original source code snippet in the second language that has not yet been used to train the translation model. In some implementations, this subset may correspond to the subset of ground truth tokens selected at block 506. For example, if the subset of ground truth tokens selected at block 506 included the first token of the ground truth translation of the original source code snippet, then the subset of predicted tokens of the predicted translation selected at block 514 may similarly include the first predicted token. If, during a later iteration, the subset of ground truth tokens selected at block 506 included the first 136 tokens of the ground truth translation of the original source code snippet, then the subset of predicted tokens of the predicted translation selected at block 514 may similarly include the first 136 predicted tokens.

At block 516, the system, e.g., by way of ML module 230, may compare the subsets of one or more tokens selected at blocks 506 to those selected at block 514. Based on the comparison, at block 518, the system, e.g., by way of ML module 230, may train the translation model, e.g., using techniques such as back propagation, gradient descent, etc. Method 500 may then proceed back to block 504. If there are more extracted tokens of the ground truth translation of the original source code snippet that have not yet been used to train the translation model, then a subset of those may be selected at block 506 and method 500 may proceed as described above. However, if at block 504, the system determines that there are no more extracted tokens that haven't been used for training, then method 500 may end.

Figure 6:
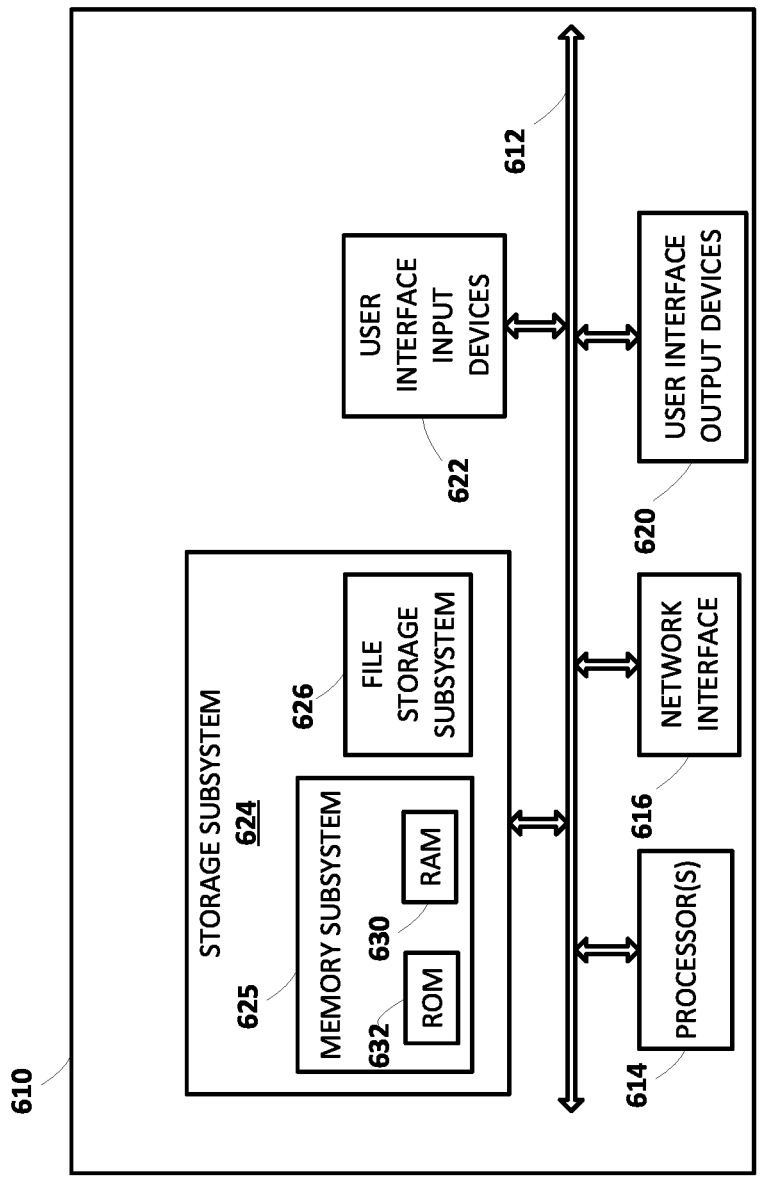
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 4-5, as well as to implement various components depicted in FIGS. 1-2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for translating a source code snippet from a first programming language to a second programming language, the method implemented by one or more processors and comprising:
    processing the source code snippet written in the first programming language using an encoder portion of a transformer network to generate an embedding of the source code snippet;
    processing the embedding of the source code snippet using an all-pair attention layer to generate an attended embedding of the source code snippet;
    processing the attended embedding of the source code snippet using an output layer to generate, independently of sequence-to-sequence decoding by way of a single transformation of the attended embedding of the source code snippet, a matrix of probability distributions, wherein the matrix comprises an x by y matrix, with x being a non-zero integer equal to a number of tokens extracted from the source code snippet; and
    once the matrix of probability distributions is generated, sampling a plurality of candidate second programming language snippets based on the matrix of probability distributions.

2. The method of claim 1, wherein y is a non-zero integer equal to a vocabulary size of the second programming language.

3. The method of claim 1, further comprising selecting the tokens of the translation of the source code snippet in the second programming language based on maximum probabilities in the matrix of probability distributions.

4. The method of claim 1, wherein the sampling comprises using a Gumbel-max trick, random temperature-based sampling, top-k sampling, or nucleus sampling.

5. A method of training a translation model to translate source code from a first programming language to a second programming language, without using a sequence-to-sequence decoder, the method implemented using one or more processors and comprising:
    iteratively training the translation model using a pair of source code snippets, including an original source code snippet written in the first programming language and a ground truth translation of the original source code snippet in the second programming language, wherein during each iteration, the training includes:
    processing the original source code snippet using one or more encoder layers of the translation model to generate an embedding of the original source code snippet;
    processing data indicative of the embedding using an output layer to generate, by way of a single transformation, data indicative of a predicted translation of the original source code snippet in the second programming language;
    selecting a different subset of one or more predicted tokens of the predicted translation of the original source code snippet in the second language that has not yet been used to train the translation model;
    comparing the selected subset of one or more tokens to a corresponding subset of one or more tokens of the ground truth translation of the original source code snippet in the second programming language; and
    training the translation model based on the comparison.

6. The method of claim 5, wherein during each iteration, the training further includes processing the embedding of the source code snippet using an all-pair attention layer to generate an attended embedding of the source code snippet, wherein the data indicative of the embedding comprises the attended embedding.

7. The method of claim 5, wherein the translation model comprises a transformer network.

8. The method of claim 5, wherein the output layer comprises a softmax layer.

9. The method of claim 5, wherein the data indicative of the predicted translation comprises a matrix of probability distributions.

10. The method of claim 9, wherein the matrix comprises an x by y matrix, with x being a non-zero integer equal to a number of tokens extracted from the source code snippet.

11. The method of claim 10, wherein y is a non-zero integer equal to a vocabulary size of the second programming language.

12. A system for translating a source code snippet from a first programming language to a second programming language, the system comprising one or more processors and memory storing instructions that, in response to execution of the instructions, cause the one or more processors to:
    process the source code snippet written in the first programming language using an encoder portion of a transformer network to generate an embedding of the source code snippet;
    process the embedding of the source code snippet using an all-pair attention layer to generate an attended embedding of the source code snippet; and
    process the attended embedding of the source code snippet using an output layer to generate, independently of sequence-to-sequence decoding by way of a single transformation of the attended embedding of the source code snippet, a matrix of probability distributions, wherein the matrix comprises an x by y matrix, with x being a non-zero integer equal to a number of tokens extracted from the source code snippet; and once the matrix of probability distributions is generated, sample a plurality of candidate second programming language snippets based on the matrix of probability distributions.

13. The system of claim 12, wherein y is a non-zero integer equal to a vocabulary size of the second programming language.

14. The system of claim 12, further comprising instructions to select the tokens of the translation of the source code snippet in the second programming language based on maximum probabilities in the matrix of probability distributions.

* * * * *